United States Patent [19]
Costar

[11] Patent Number: 5,359,840
[45] Date of Patent: Nov. 1, 1994

[54] COMBINATION HANDRAKE, SCOOP, GRASPING TOOL AND METHOD OF USE

[76] Inventor: Donald G. Costar, P.O. Box 9905, Reno, Nev. 89507-0905

[21] Appl. No.: 177,868

[22] Filed: Jan. 4, 1994

[51] Int. Cl.⁵ .............................................. A01D 7/02
[52] U.S. Cl. ................................ 56/400.12; 172/378; 294/25
[58] Field of Search ................ 56/330, 400.01, 400.12, 56/400.16; 172/371, 378; 294/25

[56] References Cited

U.S. PATENT DOCUMENTS

| 345,846 | 7/1886 | Holmes | 294/25 X |
|---|---|---|---|
| 567,087 | 9/1896 | Fitzgerald | 294/11 |
| 968,740 | 8/1910 | Case | 431/120 |
| 2,244,072 | 6/1941 | Ledbetter | 294/25 |
| 2,525,678 | 10/1950 | Hout | 294/50.8 |
| 2,908,131 | 10/1959 | Ross | 56/400.04 |
| 3,138,211 | 6/1964 | Blom | 172/371 |
| 3,688,484 | 9/1972 | Cox | 56/400.12 |
| 3,841,684 | 10/1974 | Fleishman | 294/1 R |
| 4,018,038 | 4/1977 | Sipe | 56/400.12 |
| 4,037,397 | 7/1977 | Fiorentino | 56/400.12 |
| 4,148,510 | 4/1979 | Brack | 294/1 R |
| 4,378,670 | 4/1983 | Check et al. | 56/400.01 |
| 4,378,671 | 4/1983 | Gascon | 56/400.12 |
| 4,747,633 | 5/1988 | Stacy | 294/25 X |
| 4,991,386 | 2/1991 | Dirksen | 56/400.12 |
| 5,058,370 | 10/1991 | Russell | 56/400.12 |
| 5,114,199 | 5/1992 | Newcomer | 294/50.8 |
| 5,169,191 | 12/1992 | Benz | 294/55 |

FOREIGN PATENT DOCUMENTS 7572 3/1899 Norway .............................. 294/25

Primary Examiner—David J. Bagnell

[57] ABSTRACT

A one hand operable grasping tool having extended and crossing tines, or raking members, that transform the tool into a small one hand operable rake when in a closed position.

2 Claims, 4 Drawing Sheets

COMBINATION HANDRAKE, SCOOP, GRASPING TOOL AND METHOD OF USE

BACKGROUND

1. Field of Invention

This invention relates to garden tools generally and more particularly to rakes and grasping tools as a combination thereof.

2. Discussion of Prior Art

Because of the practice of the homeowner or gardener to maintain and beautify his yard and garden, a number of garden tools have been designed and developed for that purpose.

Specifically, the rakes, forks, and grasping tools presently available for gathering and disposal of garden debris require a user to adopt a standing posture and/or the use of both hands. While desireable when said gardener is standing and gathering debris into piles for disposal, they become a cumbersome handicap when the gardener is squatting, kneeling or attempting to use them with one hand.

Consequently, when the gardener gathers his leaves, clippings or debris into piles, he must then lay the raking or gathering implements aside in order to transfer the debris from the ground to a refuse container, generally through the use of his hands or with the aid of a fork or grasping tool, again usually requiring the use of both hands and/or a standing posture.

A diligent search and examination of existing patents, garden stores, hardware stores and catalogs have failed to reveal the existence of a practical tool that is a one hand operable rake and grasping tool in combination.

The only devices discovered that resemble this invention's concept, of one handed use, are either implements designed to facilitate the gathering of animal excrement or conventional tong type tools used in the handling of materials or objects. Neither of which would lead one skilled in the art to find this invention obvious.

The following references are cited to illustrate the points mentioned above.

1. U.S. Pat. No. 2,908,131 to Ross,
2. U.S. Pat. No. 3,688,484 to Cox,
3. U.S. Pat. No. 4,018,038 to Sipe,
4. U.S. Pat. No. 4,037,397 to Fiorentino,
5. U.S. Pat. No. 4,378,670 to Check and Goodby,
6. U.S. Pat. No. 4,378,671 to Gascon,
7. U.S. Pat. No. 4,991,386 to Dirksen,
8. U.S. Pat. No. 5,058,370 to Russell,
9. U.S. Pat. No. 5,114,199 to Newcomer and
10. U.S. Pat. No. 5,169,191 to Benz.

All are adequately designed and constructed for raking, gathering and grasping tasks performed by gardeners in the maintenance of a yard and garden. They do, however, have one requisite in common; they all require the user to employ both hands at once, and/or work from a standing position. To further illustrate:

11. U.S. Pat. No. 567,087 to Fitzgerald,
12. U.S. Pat. No. 968,740 to Case,
13. U.S. Pat. No. 2,244,072 to Ledbetter,
14. U.S. Pat. No. 2,525,678 to Hout,
15. U.S. Pat. No. 3,138,211 to Blom,
16. U.S. Pat. No. 3,841,684 to Fleishman and
17. U.S. Pat. No. 4,148,510 to Brack.

All are one hand operable grasping tools that employ a hinge or construction that permits the points to close in order to effectively grasp material, or an object. They are net designed, nor are they constructed, for raking and gathering. Their purpose is solely for grasping and picking up materials and objects.

Consequently, the foregoing prior art being designed, adapted and constructed for purposes other than one handed raking and gathering garden debris, would not lead one skilled in the art to find this invention obvious.

OBJECTS AND ADVANTAGES

Accordingly, the inventor claims the following as objects and advantages of this invention:

To provide a one hand operable raking and grasping tool of simple, yet efficient, construction that may be manufactured at low cost, thereby providing the gardener or homeowner with a tool that is inexpensive and fills a definite need;

To provide a one hand operable raking and grasping tool that offers a means for raking, gathering and removing unwanted garden debris around plants, flowers and shrubs that grow close to the ground or close together;

To provide a one hand operable garden tool that leaves the other hand of the gardener free to be used either to hold a refuse container, or to support and balance the gardener himself while reaching under and around shrubs, flowers and plants;

To provide a garden tool that requires no attachments or modifications to perform said raking, gathering or grasping tasks, but through a novel cooperation of elements used and operated by only one hand;

To provide a garden tool that may be used efficiently and comfortably by a gardener working close to the ground, either in a squatting or kneeling position;

To provide a garden tool held and operated in one hand, that is a garden rake while held in the closed position, then is transformed into a grasping tool when held in the open position.

Other objects and advantages of the invention will become apparent to those skilled in the use of tools and implements through consideration of the ensuing descriptions and accompanying drawings.

DRAWING FIGURES

Figure 1:
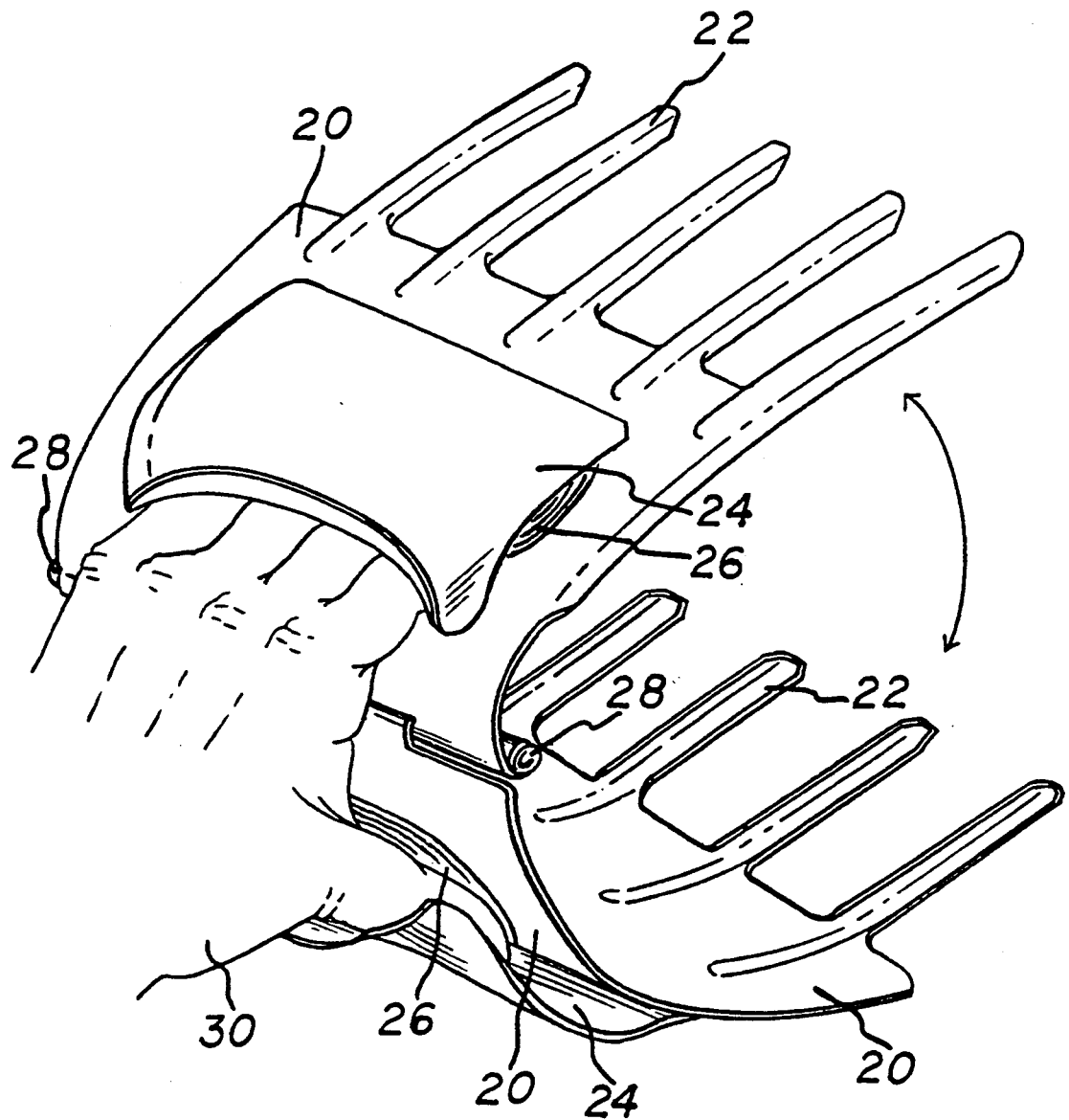
FIG. 1 shows, as a preferred embodiment, the perspective back elevation view of the hand rake and grasping tool held in the open or grasping mode.

Drawing Reference Numerals 20 substantially planar body element
22 raking means
24 finger guard means
26 substantially concave receiving means
28 hinge means
30 either right or left hand of operator
32 hinge curl formed in 20 of preferred embodiment

SUMMARY OF THE INVENTION

This invention offers a new and useful device whereby a user may rake, gather, grasp and pick up yard debris, through the use of only one hand, thereby leaving said user's other hand free and unencumbered.

DESCRIPTION OF THE INVENTION

Figure 2:
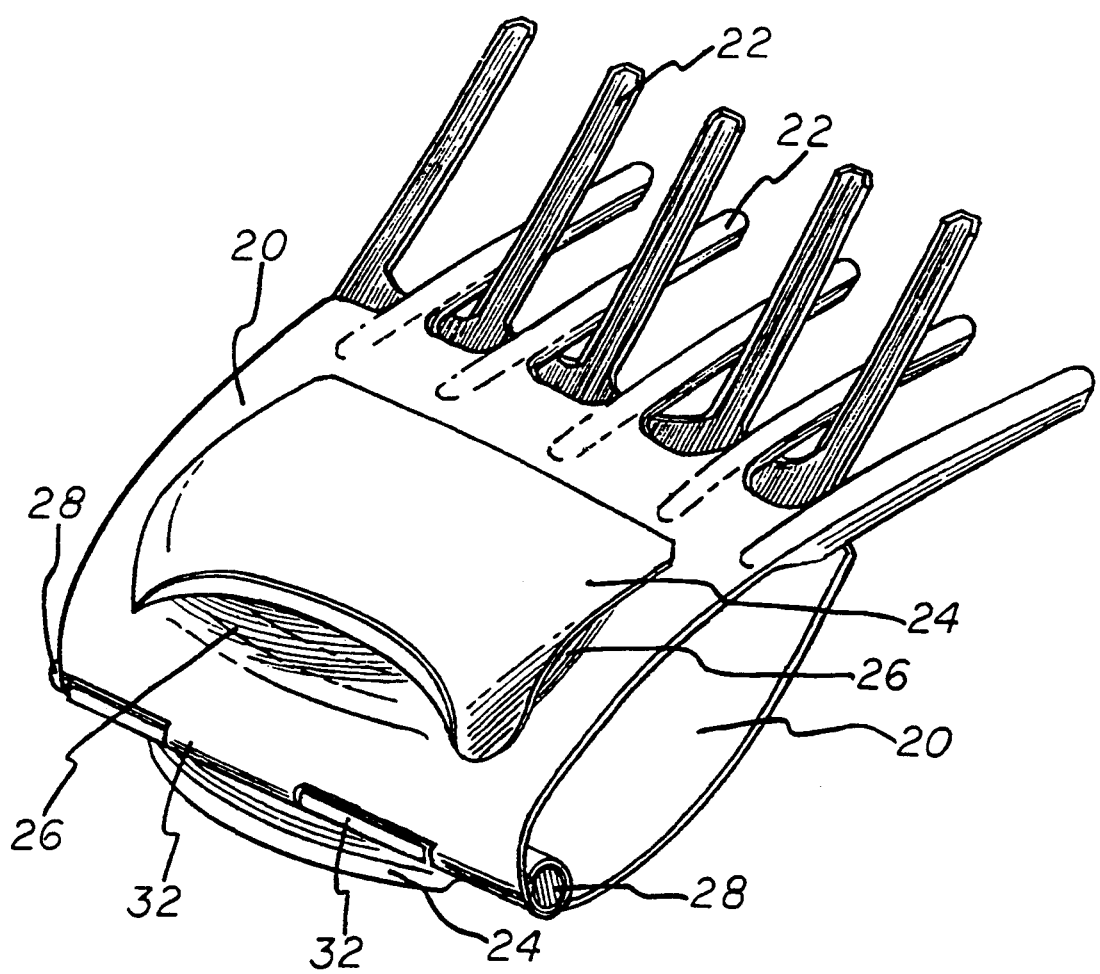
FIG. 2 shows a perspective back elevation view of the embodiment in FIG. 1 of the hand rake and grasping tool in the closed or raking mode.
Figure 3:
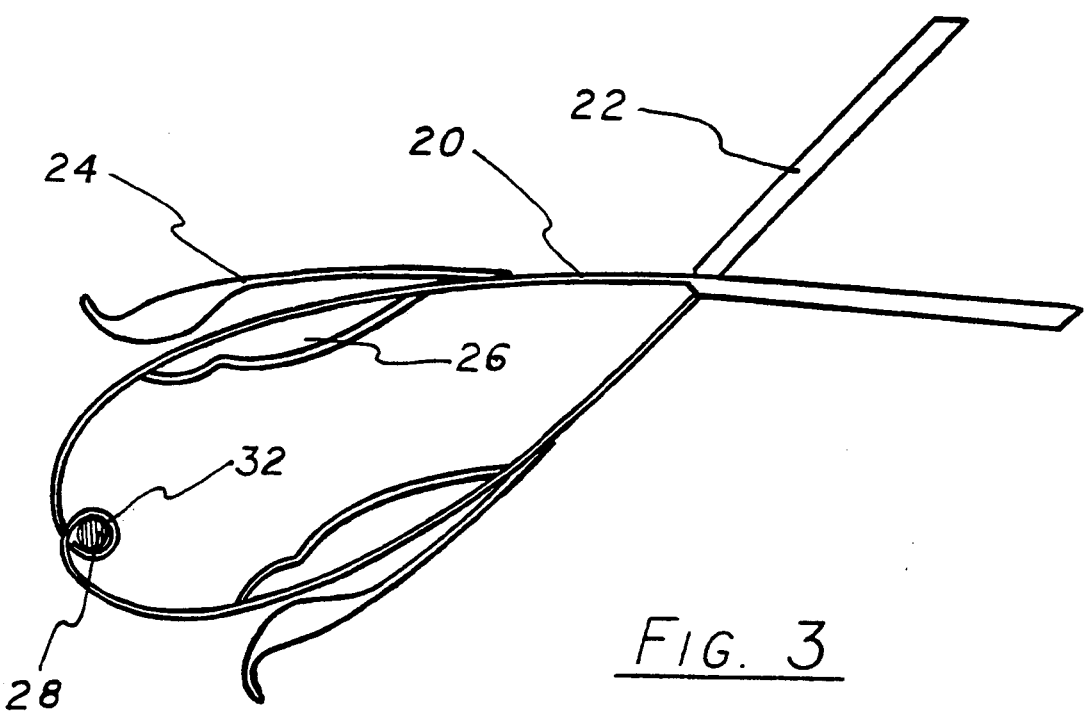
FIG. 3 shows a full side view of the hand rake and grasping tool embodiment in FIG. 2 in the closed or raking mode.
Figure 4:
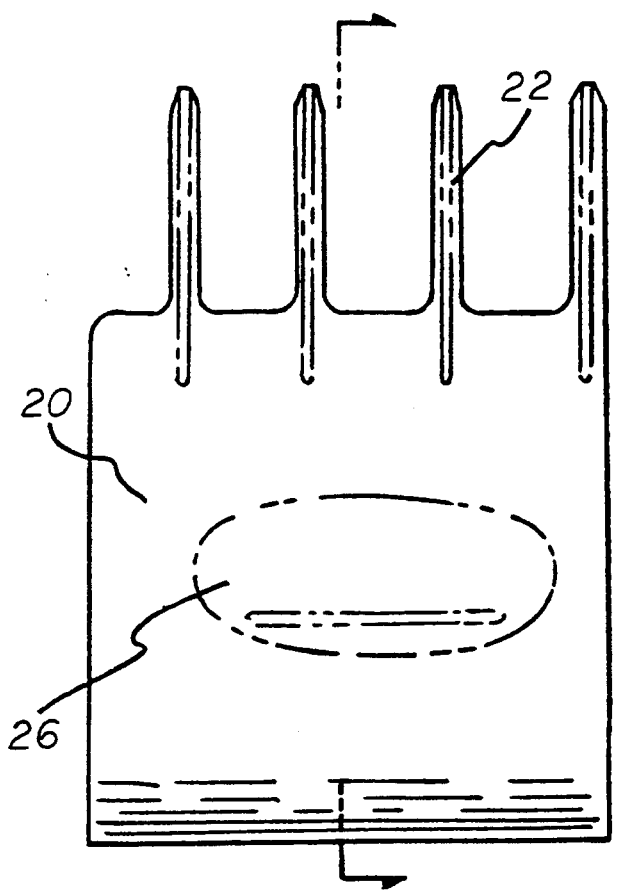
FIG. 4 shows a top full face view of one of the two opposing elements that comprise the main body of the hand rake and grasping tool embodiment shown in FIG. 3.
Figure 5:
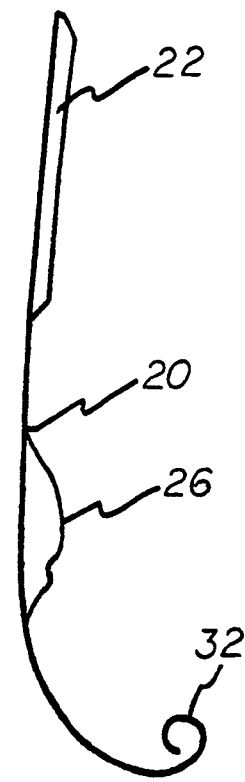
FIG. 5 shows a full side cross-sectional view of the body element shown in top full face view in FIG. 4.
Figure 6:
FIG. 6 shows a full side view of the hinge pin means required in the preferred embodiment construction as shown in FIGS. 1 and 2.
Figure 7:
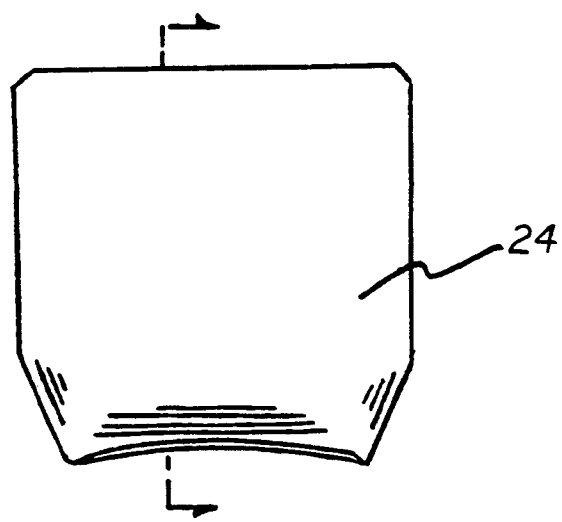
FIG. 7 shows a top full face view of one of the finger guard means shown as part of preferred embodiments in FIGS. 1 and 2.
Figure 8:
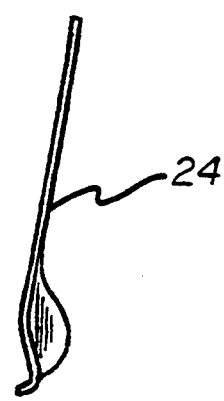
FIG. 8 shows a full side cross-sectional view of the finger guard means shown in FIG. 7.
Figure 9:
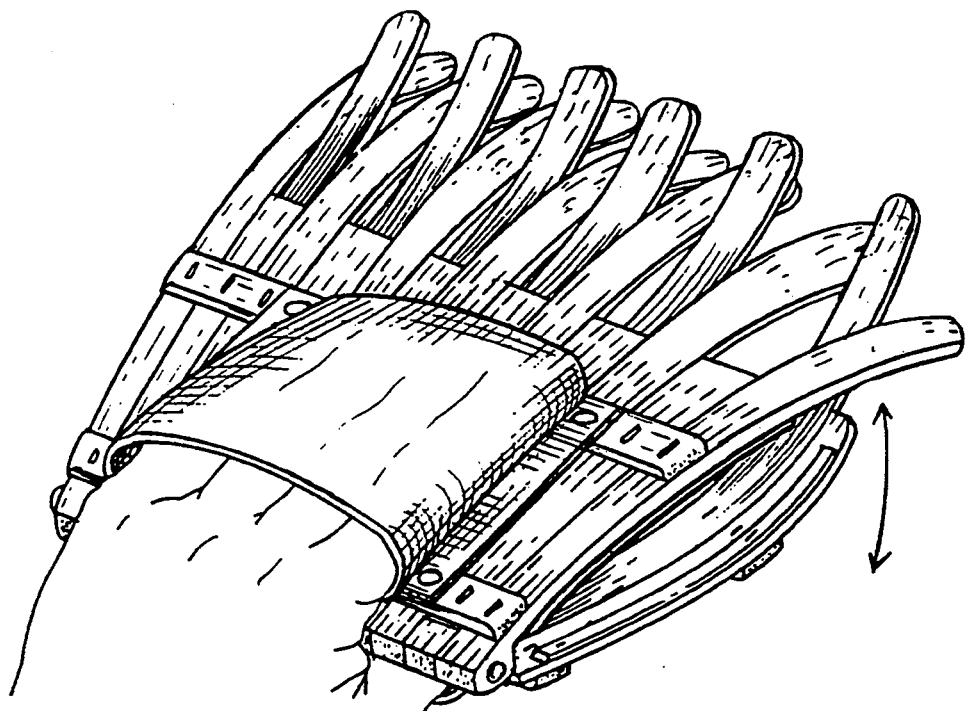
FIG. 9 shows another embodiment of the hand rake and grasping tool made of natural, or fibrous, material, similar to bamboo, in a closed or raking mode.
Figure 10:
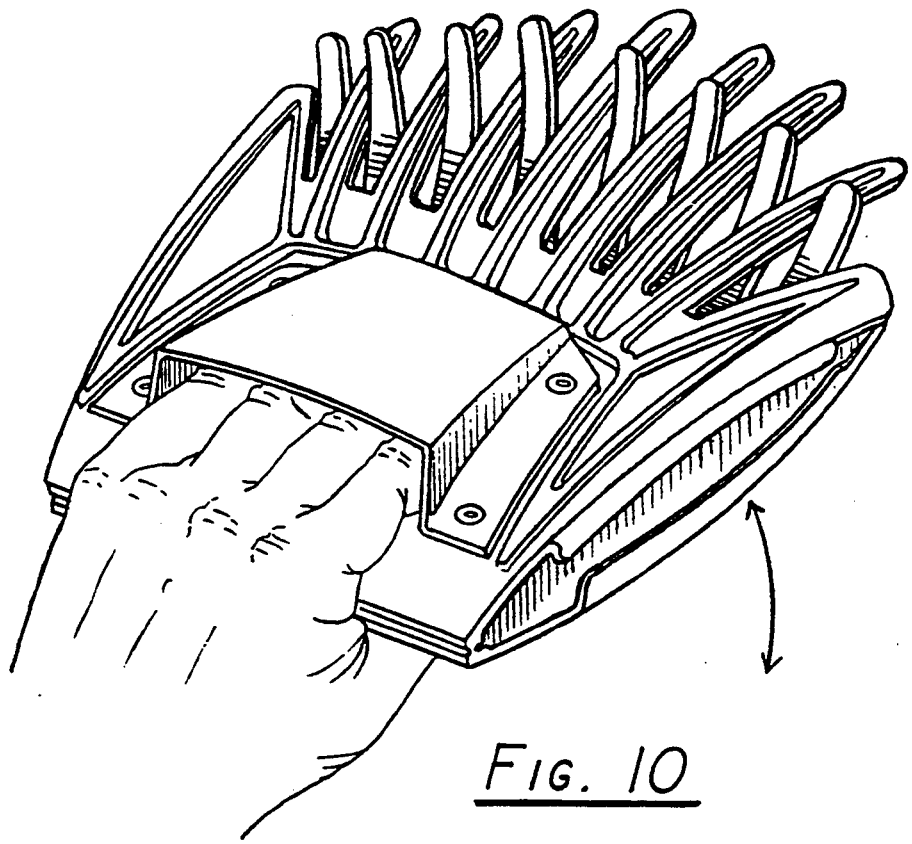
FIG. 10 shows another embodiment of the hand rake and grasping tool made of plastic material wherein several of its parts may be integrally molded with the whole.

The invention comprises a novel combination of substantially planar body elements 20 to form a device that is shown as a preferred embodiment in FIGS. 1 and 2. Said body elements 20 comprise a hinge means, typically a hinge pin 28 substantially enclosed in a curl 32 formed in the invention's body elements 20, for pivotally connecting said body elements 20 at a rearward, or first end, of the body elements 20. A substantially concave recessed receiving means 26 at a predetermined location between the first end and a forward, or second end, of the planar body elements 20. A finger guard means 24 in cooperation with the concave recessed receiving means 26 and a plurality of tines, or raking means 22, formed into the body elements 20 at the second end.

OPERATION OF THE INVENTION

Referring now to FIG. 2, wherein the hand rake and grasping tool invention is shown in a closed position, this is the preferred embodiment of a device that when held in the user's hand 30, in this manner, can be used as a small rake.

It will be noted that the device has opposing elements 20, so a user need only grasp the device at a first, or hinged end 28, with either right or left hand and with the user's fingers on either the top or bottom body element, whichever is most comfortable and convenient. By doing so, the user finds that his thumb and fingers are received into a substantially concave depression, or receiving means, 26 that is in either body element 20. This allows the user to safely pick up and hold the device, applying slight pressure through the thumb and fingers of the hand 30 to keep the device closed, as in FIG. 2.

The device is now held so that it becomes an extension of the user's arm, much as a long handled rake becomes an extension of the user's two arms. The difference now being that only one arm is needed for raking while the user's other hand and arm remain free and unencumbered.

While holding the device as heretofore described and as shown in FIG. 2 the user can not only rake debris into piles for disposal, but can now easily and safely rake under and around fragile plants, flowers and shrubs that require maintenance.

As can be readily visualized, by using the invention and employing this method of raking and gathering, the gardner can gather fallen and unwanted debris and use whatever degree of strength and dexterity he wishes without significant damage to the plants he is tending.

When sufficient debris is gathered into a pile, the user, may grasp and pick up a quantity of debris by first reversing the pressure exerted by the thumb and fingers outwardly against the inside surfaces of the finger guards 24, thereby forcing the body elements apart, simulating the opening motion of a clam shell. Upon performing said outward motion, which forces the device into the configuration depicted in FIG. 1, the device can now be employed either as a grasping pair of forks to pick up said pile of debris, or by turning the hand over so the user's palm is facing upwards the device may be employed by the user as a grasping scoop, relying on the finger guard 24 for protection against cuts, scrapes or the like. By closing the grasping tool device over the debris, the user can now easily transfer the debris to a suitable container for disposal.

Upon depositing said scoopful of debris into a refuse container, the device can now be closed again into the raking mode as shown in FIG. 2, allowing the user to continue with his cleanup task, raking as before.

The one handed operable feature of the invention, having extended and crossing tines, so as to be transformed into a rake, appears to be a truly new and useful concept, not an obvious evolution of either rakes, scoops or grasping devices.

It should be noted that while the above operational description is a preferred embodiment of the invention in the field of gardening, it should not be construed as a restrictive specification, only as an embodiment use. Because of the need for maintenance and/or clean up tasks in other fields besides gardening, the invention will also be needed and used in the clean up of such things as dangerous and/or contaminated materials from accidents or disasters and the like. Those skilled in the manufacture of rakes, scoops and grasping tools will envision other construction variations that may accomplish the same or similar tasks in other fields and disciplines, such as gathering and handling dangerous animals or reptiles and the like.

I claim:

1. A one hand operable combination rake, scoop, and grasping implement comprising; a pair of elongated substantially planar body elements, each of said body elements having a substantially arcuate form longitudinally, means forming a hinge connection between two adjacent end edges of said body elements, said body elements lying side by side relation with their concave sides thereof opposed, raking means being in the form of tines along the other end edge of each of said body elements, finger guard means, said finger guard means being in the form of a pocket suitably formed on each body element upon the side thereof remote from the other body element, said pocket being of a size and shape to except at least four fingers of a hand, said pocket being closed on said other end edge of each of said body elements, said combination implement having a first and second position, said first position being substantially open with said tines of one of said body element being substantially out of communication with said tines of said other body element, said second position being substantially closed with said tines of one of said body element passing by and between said tines of said other body element, whereby;

when said combination implement is in its said first position said combination implement may be used by a user as a scoop and a grasping implement and when said combination implement is in its said second position, said impement may be used by a user as a rake.

2. A method of raking, gathering, scooping and grasping materials, objects, or debris using a one hand operable rake and grasping implement which comprises;

(a) grasping said one hand operable rake and grasping implement with one hand of a user with the fingers and thumb of said hand inserted into finger guards;
(b) closing said raking and grasping implement by exerting pressure of said users fingers and thumb in a grasping manner;
(c) allowing tines of said implement to pass by and between each other forming a rake;
(d) performing a raking operation with said tines while holding said implement in a closed position;
(e) opening said raking and grasping implement by exerting reverse pressure of said users fingers and thumb and
(f) grasping, picking up or scooping up said materials, objects or debris for transfer or disposal by again exerting pressure of said users fingers and thumb in a grasping manner.

* * * * *